United States Patent [19]
Chen et al.

[11] Patent Number: 5,819,083
[45] Date of Patent: *Oct. 6, 1998

[54] MINIMAL SUFFICIENT BUFFER SPACE FOR DATA REDISTRIBUTION IN A PARALLEL DATABASE SYSTEM

[75] Inventors: Wen-Tzer Thomas Chen; Shih-Gong Li, both of Austin, Tex.

[73] Assignee: International Business Machines Corporation, Armonk, N.Y.

[ * ] Notice: The terminal 15 months of this patent has been disclaimed.

[21] Appl. No.: 116,087

[22] Filed: Sep. 2, 1993

[51] Int. Cl.[6] .......................... G06F 15/163; G06F 17/30; G06F 13/14
[52] U.S. Cl. .................... 395/610; 395/876; 395/200.03; 395/200.12
[58] Field of Search ..................................... 395/600, 650, 395/200, 325, 250, 872, 873, 874, 875, 876–877, 878, 200.12, 200.01, 200.03, 610; 370/60

[56] References Cited

U.S. PATENT DOCUMENTS

| | | |
|---|---|---|
| 4,926,324 | 5/1990 | Yamamoto et al. ..................... 395/275 |
| 5,179,662 | 1/1993 | Corrigan et al. ........................ 395/250 |
| 5,339,413 | 8/1994 | Koval et al. ............................ 395/650 |

Primary Examiner—Thomas G. Black
Assistant Examiner—Jack M. Choules
Attorney, Agent, or Firm—Mark E. McBurney; Andrew J. Dillon

[57] ABSTRACT

A method, system and program for distributing data to a first node in a parallel database system from a plurality of existing nodes. First, a minimal sufficient number of communication buffers necessary to guarantee that a table scan operation in each of the existing nodes will execute without stopping is determined. Once calculated, the minimal sufficient number of communication buffer is allocated in the memory associated with each of the existing nodes. Thus, data from each of the plurality of existing nodes to the first node can be redistributed without interruption. Unless the redistribution process has a default set of data to be redistributed, which data from which data tables in each of the plurality of existing nodes is to be distributed to the first node must be determined. The first node may either be a new node which must be registered within the parallel database system, or an existing node within an imbalanced parallel database system which has excess capacity. The minimal sufficient number of communication buffers is determined according to the ratio of a mean queuing in a communication buffer and an average time to fill a communication buffer.

12 Claims, 9 Drawing Sheets

RELATIONAL DATABASE TABLE

MINIMAL SUFFICIENT BUFFER SPACE FOR DATA REDISTRIBUTION IN A PARALLEL DATABASE SYSTEM

BACKGROUND OF THE INVENTION

This invention relates generally to data messaging, retrieval and storage in a data. processing system. More particularly, it relates to providing minimal sufficient buffer space for a table scan operation in a parallel database system where a new node is added.

Databases have become the subject of significant recent interest, not only because of the increasing volume of data being stored and retrieved by computerized databases, but also by virtue of the data relationships which can be established during the storage and retrieval processes.

In the last decade, database system developers have turned their attention toward parallel processing platforms, because a parallel processing system's cost/performance ratio is often superior to that of conventional mainframes. Set-oriented database systems, like relational database systems, are particularly well-suited to parallel processing since the database can be spread across the multiple computers or "nodes" in the system, and requests against the database can thus be executed in parallel. A generic parallel database system is characterized by a cluster of powerful, inexpensive microprocessor-based computers, each of which includes one or more disk storage devices with high performance and capacity. The nodes are interconnected using a shared communication medium. The cluster uses standard "off the shelf" microprocessor and workstation hardware products to take advantage of the high performance, lower cost, and higher reliability found in commodity components. When the database size or workload grows near the capacity of the system, more nodes can be added to extend that capacity.

In such a system, the database is distributed across the nodes and each node stores a fraction of the database. Likewise, the workload is distributed across the nodes as requests are sent to the nodes that contain the desired data and are executed there. Consequently, data placement determines how well the workload is balanced across the nodes, and how well the system performs as a whole. In many cases, the best performance can be obtained by spreading the workload as evenly as possibly across all of the nodes. However, in an initially balanced system, the type and frequency of requests will change over time, data will be added to and deleted from the database over time, causing the workload to shift over time. Eventually, the system will become imbalanced across the nodes. Thus, the data will occasionally have to be redistributed to rebalance the load. Also, as nodes are added or deleted from the system, the data will have to be redistributed across the new number of nodes.

In a Parallel Database (PDB) System, data records are partitioned into data structures hereinafter referred to as "buckets". All the data records belonging to a bucket should always be placed into a single node. When adding new nodes into the PDB system, "buckets" of data must be moved from the existing nodes to the new nodes. A logical link is established with a predefined number of communication buffers for sending data records from the old residing node to the new node. As most relational database systems do not support a physical bucket in their storage organization, a table scan is required to select the to-be-moved records into communication buffers for redistribution. Because the table scan operation requires a table lock, it is logical to lock the same table on every PDB node to obtain the exclusive right on this particular table for data integrity and data placement consistency. Thus, every node will execute based on the same table sequence for data redistribution. However, the table locking makes performance one of the primary concerns for the operation of adding a new node. The faster the locks can be released, the less impact to the other ongoing transactions in PDB system.

When many PDB nodes are involved in data redistribution to the new node at the same time, there will be a large number of messages containing data from communication buffers flowing into the PDB communication trunk. When the message arriving rate is larger than the sending rate, some arrival messages are forced to wait before they can be handled. If a message is not successfully received by the destination node, but its corresponding communication buffer in the sending node has been freed, it is very expensive to recover these data records for resending. Therefore, when adding a new node, the data redistribution process is usually designed to receive an acknowledgement of a message transmission before releasing its corresponding buffer. However, delaying the release of the communication buffers at sending nodes may cause insufficient buffer space and force the full table scan operation to halt. Although a larger buffer space means a smoother scan operation, it is not efficient to allocate buffer space more than the minimum requirement, especially when the opportunity cost is considered in buffer allocation.

SUMMARY OF THE INVENTIONS

Therefore, it is an object of the invention to determine and allocate the minimal sufficient buffer space for a logical link to prevent the table scan process from halting.

It is another object of the invention to efficiently redistribute data to a new node within a parallel database system.

It is another object of the invention to efficiently rebalance data in an imbalanced parallel database system.

These objects and other features and advantages are accomplished by a method, system and program for distributing data to a first node in a parallel database system from a plurality of existing nodes. A minimal sufficient number of communication buffers necessary to guarantee that a table scan operation in each of the existing nodes will execute without stopping is determined. Once calculated, the minimal sufficient number of communication buffers is allocated in the memories associated with each of the existing nodes. Thus, data to be transferred from each of the plurality of existing nodes to the first node can be redistributed without interruption. The redistribution process must decide which data from which data tables in each of the plurality of existing nodes is to be distributed to the first node. The first node may either be a new node which must be registered within the parallel database system, or an existing node within an imbalanced parallel database system which has excess capacity. The minimal sufficient number of communication buffers is determined according to the ratio of a mean queuing time in a communication buffer and an average time to fill a communication buffer.

With the objective of achieving zero halting time in full table scan process, the present invention uses a queuing model to describe the behavior of data redistribution using table scan method. By using this queuing model, a description of the system's behavior in steady state can be formulated and then used to determine the minimal sufficient buffer space for a logical link.

BRIEF DESCRIPTION OF THE DRAWINGS

These features, advantages, objects and others will be more readily understood with reference to the attached drawings and following description.

DETAILED DESCRIPTION OF THE DRAWINGS

The invention may be run on a collection of computers including variety of computers made by different vendors under a number of different operating systems. Computers in the system could be, for example, a personal computer, a mini computer or mainframe computer. The computer network could be a Local Area Network or a Wide Area Network or larger teleprocessing system. Although the specific choice of computer is limited only by disk and disk storage requirements, computers in the IBM PS/2™ series of computers could be used in the present invention. For additional information on IBM's PS/2 series of computers, the reader is referred to Technical Reference Manual Personal System/2 Model 50, 60 Systems IBM Corporation, Part No. 68X2224 Order Number S68X-2224 and Technical Reference Manual Personal Systems/2 (model 80) IBM Corporation Part No. 68X2256 Order Numbers 68X-2254. One operating system which an IBM PS/2 personal computer may run is IBM's OS/2 2.0™ for more information on the IBM OS/2 2.0 operating system, the reader is referred to OS/2 2.0 Technical Library, Programming Guide Vol. 1, 2, 3 Version 2.00 Order Nos. 10G6261, 10G6495, 10G6494.

In the alternative, computer systems in the IBM RISC System/6000™ line of computers which run on the AIX™ operating system could comprise the network. The various models of the RISC System/6000 are described in many publications of the IBM Corporation, for example, RISC System/6000, 70731 and 7016 POWERstation and POWERserver Hardware Technical Reference, Order No. SA23-2644-00. The AIX operating system is described in General Concepts and Procedure—AIX Version 3 for RISC System/6000 Order No. SC23-2202-00 as well as other publications of the IBM Corporation.

Figure 1:
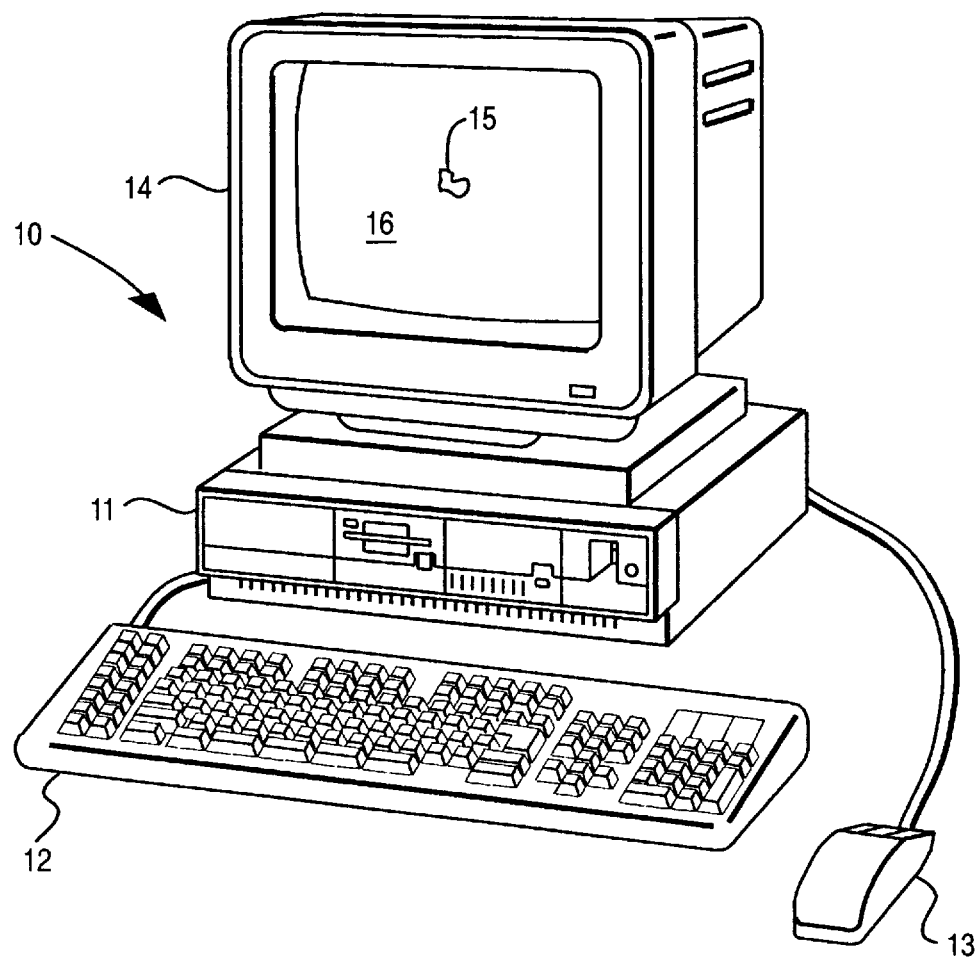
FIG. 1 depicts a single computer system including system uni,t display, keyboard and mouse.

In FIG. 1, a computer 10, comprising a system unit 11, a keyboard 12, a mouse 13 and a display 14 are depicted. The screen 16 of display device 14 is used to present visual feedback to the user on parallel database operations. A graphical user interface supported by the operating system allows the user to use a point and shoot method of input by moving a mouse pointer 15 to an icon representing a selection at a particular location on the screen 16 and press one of the mouse buttons to perform a user command or selection.

Figure 2:
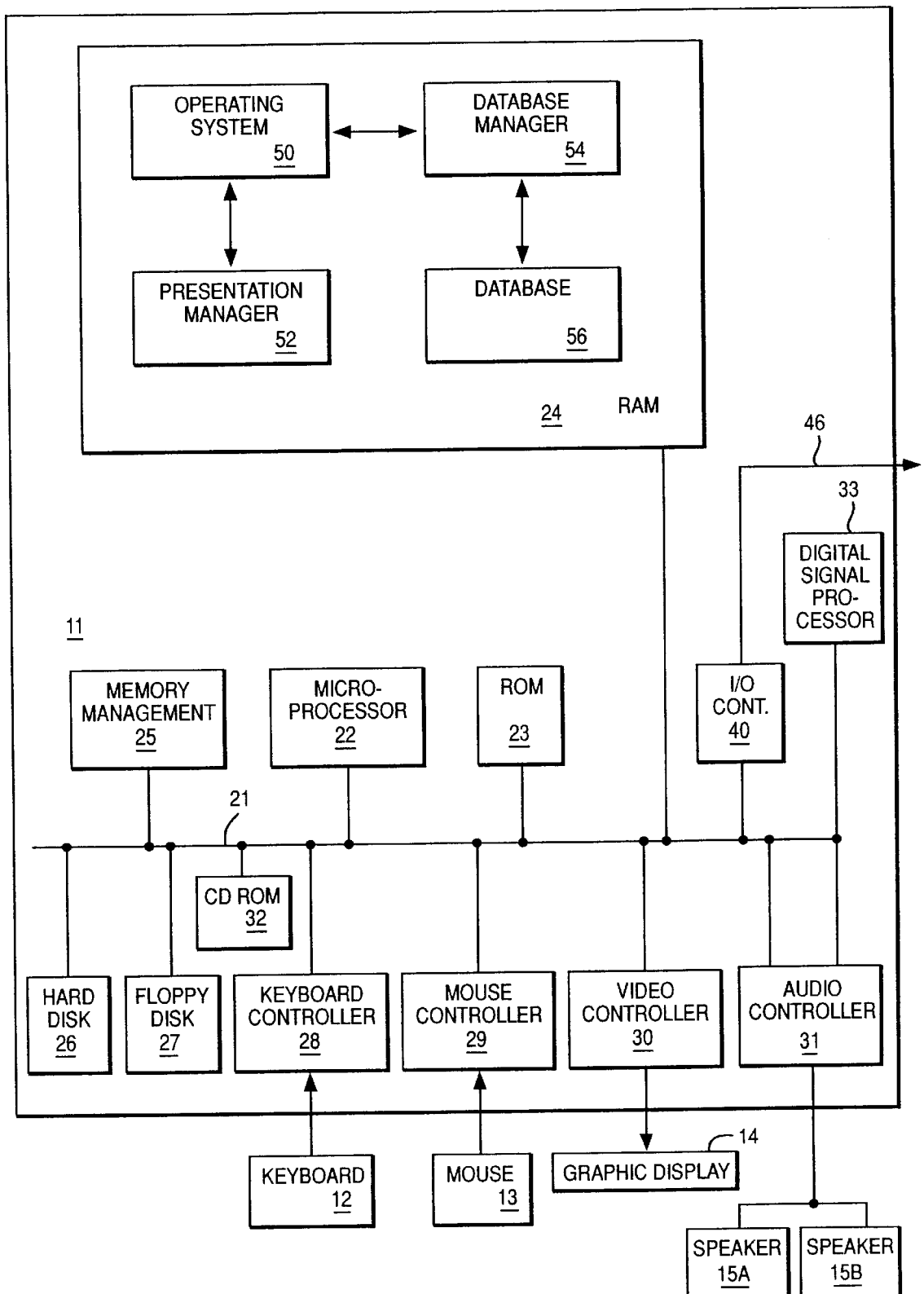
FIG. 2 is a block diagram of the components of the computer depicted in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors included, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. A CD ROM drive 32 also coupled to the system bus 21 is used to store a large amount of data.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory of at least one of the computers in the network. Until required by the computer system, the set of instructions may be stored in another computer memory, for example, the hard disk in hard drive 26, or a removable computer memory such as an optical disk in the CD ROM 32 or a floppy disk in the floppy disk drive 27. As shown in the figure, the operating system 50 and presentation manager 52 are resident in RAM 24. In this example, the invention is embodied in a database manager 54 which cooperates with the operating system. The database manager 54 manages a database 56 which forms a portion of the parallel database system.

Figure 3:
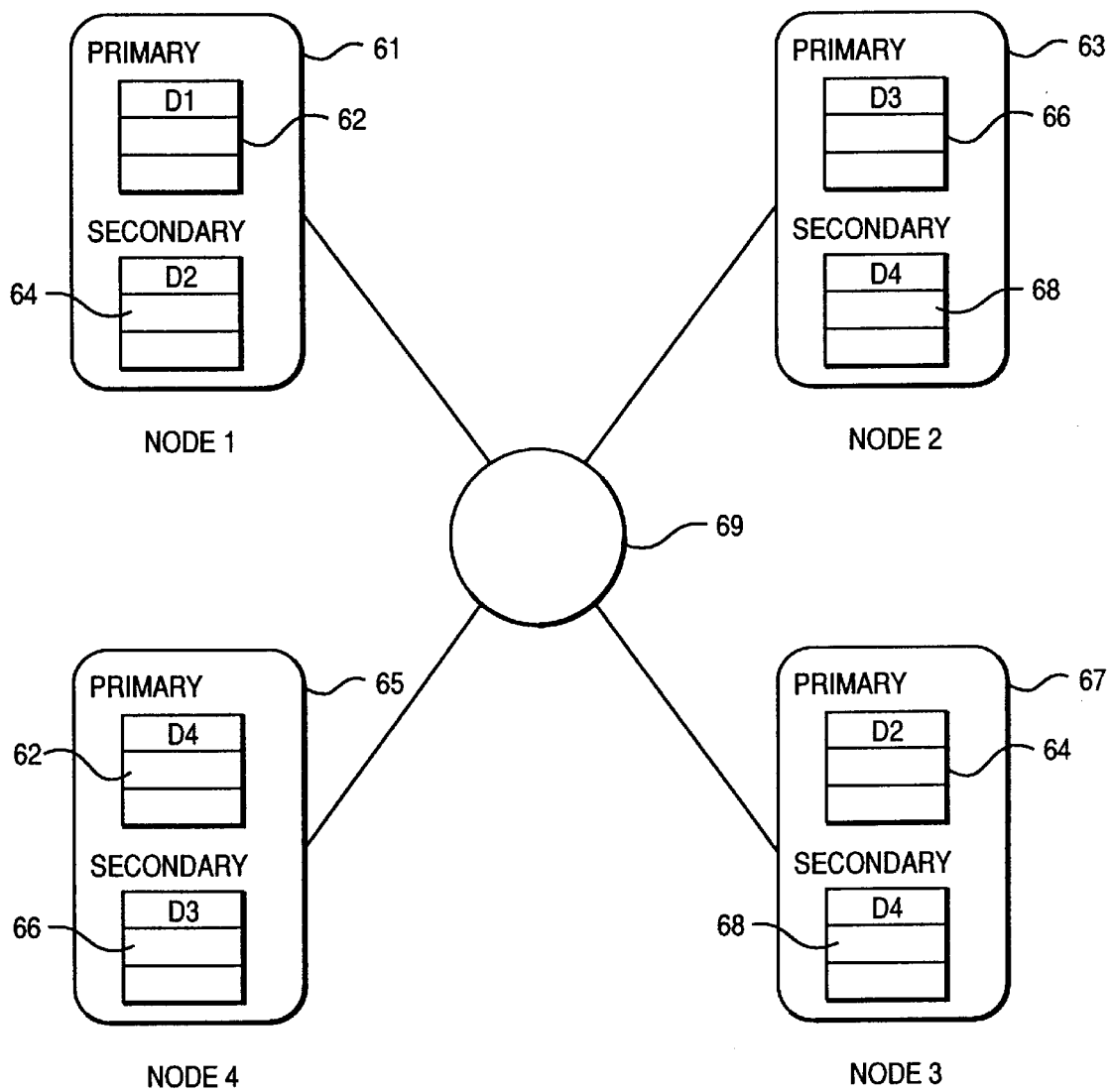
FIG. 3 depicts a parallel database system.

A parallel database system comprised of a plurality of computer systems coupled to a network is depicted in FIG. 3. Four computer systems or nodes 61, 63, 65, 67 are coupled together by means of a network 69. As discussed previously, the computer systems are typically personal computers or workstations. The network can be a Local Area Network, such as a Token Ring or Ethernet Network which conform to ISO and IEEE standards or a Wide Area Network including telecommunication links. Both the Token Ring or Ethernet Network conform IEEE and International Standard Organization standards for local area networks. The ISO family of standards are described in standard publications ISO 8802-2(Logical Link Control Protocol), ISO 8802-3 (CSMA/CD Bus), ISO 8802-4(Token passing bus),ISO 8802-5(Token Passing Ring), and ISO 8802-7(Slotted Ring).

The parallel database system stores a plurality of tables 62, 64, 66 and 68 at each of the nodes. Notice that a parallel database normally has redundant storage of the tables for fault tolerance purposes in case one node is unavailable. For example, if node 61 which holds tables 62 and 64 goes down, table 62 is available at node 65 and table 64 is available at node 67. As mentioned previously, a relational databases is particularly useful within a PDB system. One of the better known languages for relational databases is the standard Structure Query Language (SQL). A search is defined in a query which defines the tables in which the data will be found. The table columns of interest, the conditions rows must satisfy, the order of columns, distinctiveness constraints, connections of data within tables and other relationships one also specified in the query. Within a PDB system, if the search query can not be satisfied using locally stored data, a remote call is made for other portions of the database stored at other nodes. For more information on relational databases, and in particular SQL and its uses, the reader is referred to IBM Operating Systems/2 Extended Edition Database Managers Structured Query Language (SQL) Concepts Booklet published by the IBM Corporation in 1991.

Figure 4:
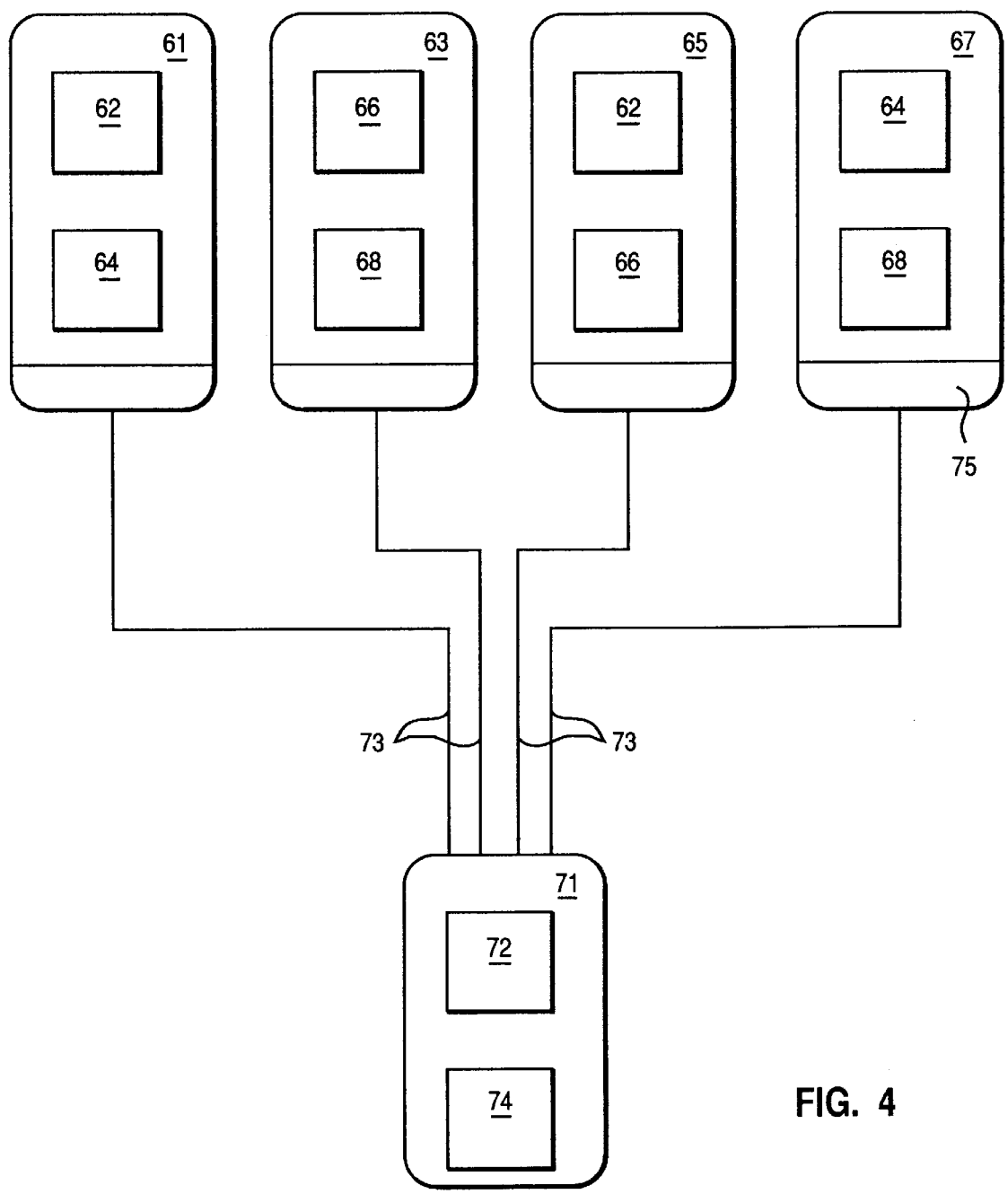
FIG. 4 depicts a parallel database system in which a new node is added.

The situation when a new node is added to the parallel database system is depicted in FIG. 4. New node 71, which will include tables 72 and 74 will be added to the network depicted in FIG. 3. Logical links 73 will be connected to each of the existing nodes 61, 63, 65, 67 to facilitate transfer of portions of the existing tables 62, 64, 66, 68 to the new node 71. A logical link is established by the transport layers which are located at each of the nodes and include communication buffers which store the portions of the tables existing nodes prior to transmission over the logical links to new node 71. The network connectivity to provide the logical link for communication is provided by network communications software such as. A variety of protocols can be supported for example, NetBios, SNA and TCP/IP. Information on the NetBios protocol can be found in IBM Operating Systems/2 Local Area Network Server Version 2.0 Information and Planning Guide. (G236-0162); IBM Local Area Network Server Programs (Specification sheet) (G360-2753); and IBM Local Area Network Technical Reference. (SC30-3383). The network communications software is in charge of setting up a session, confirming that messages are sent and received over the LAN, bundling data from the database to conform with network protocols, etc.

The communications software also places data which cannot be immediately transmitted over the LAN into a communications buffer. Communications buffer can store header information which stores communication control information, the actual data containing the data records to be transmitted and a end section indicating the end of the data records.

Figure 5:
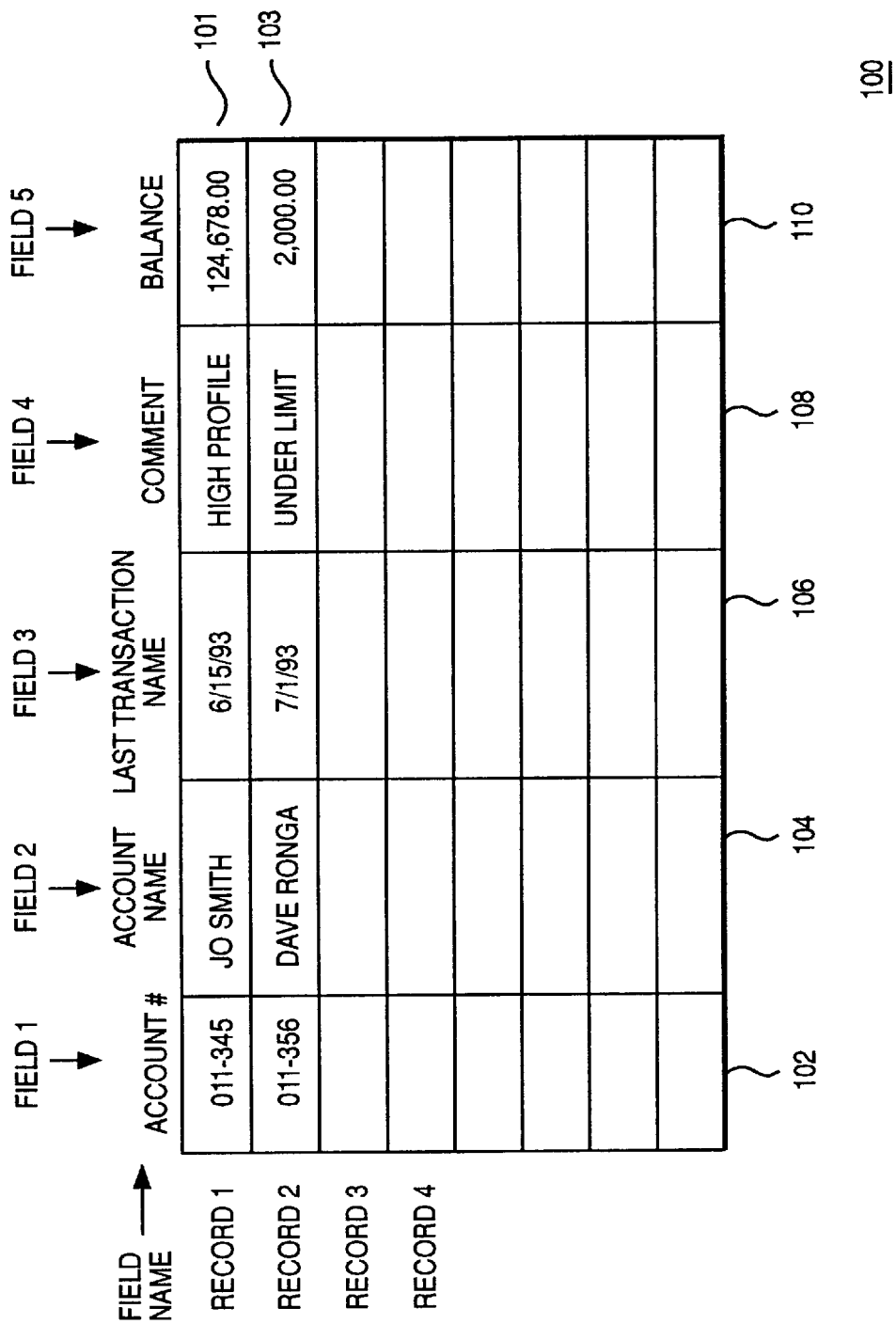
FIG. 5 depicts a table within a parallel database system.

A sample relational database table 100 is shown in FIG. 5. A table generally includes a plurality of records in rows with a corresponding set of fields in a set of columns. For example, record 1 in row 101 includes data in a plurality of fields each of which is written to a particular column, for example, account number information is written to column 1.02 account name information is written to column 104, last transaction date information is written to column 106, comment information is written in column 108 and balance information is written in column 110. While only two records with only five fields are depicted in the figure, in practice, the relational database table can become exceedingly large comprising several pages of storage. As the relational databases grow too large to accommodate on existing nodes, a new node can be added to the parallel database system and portions of the tables on existing nodes can be redistributed.

Figure 6:
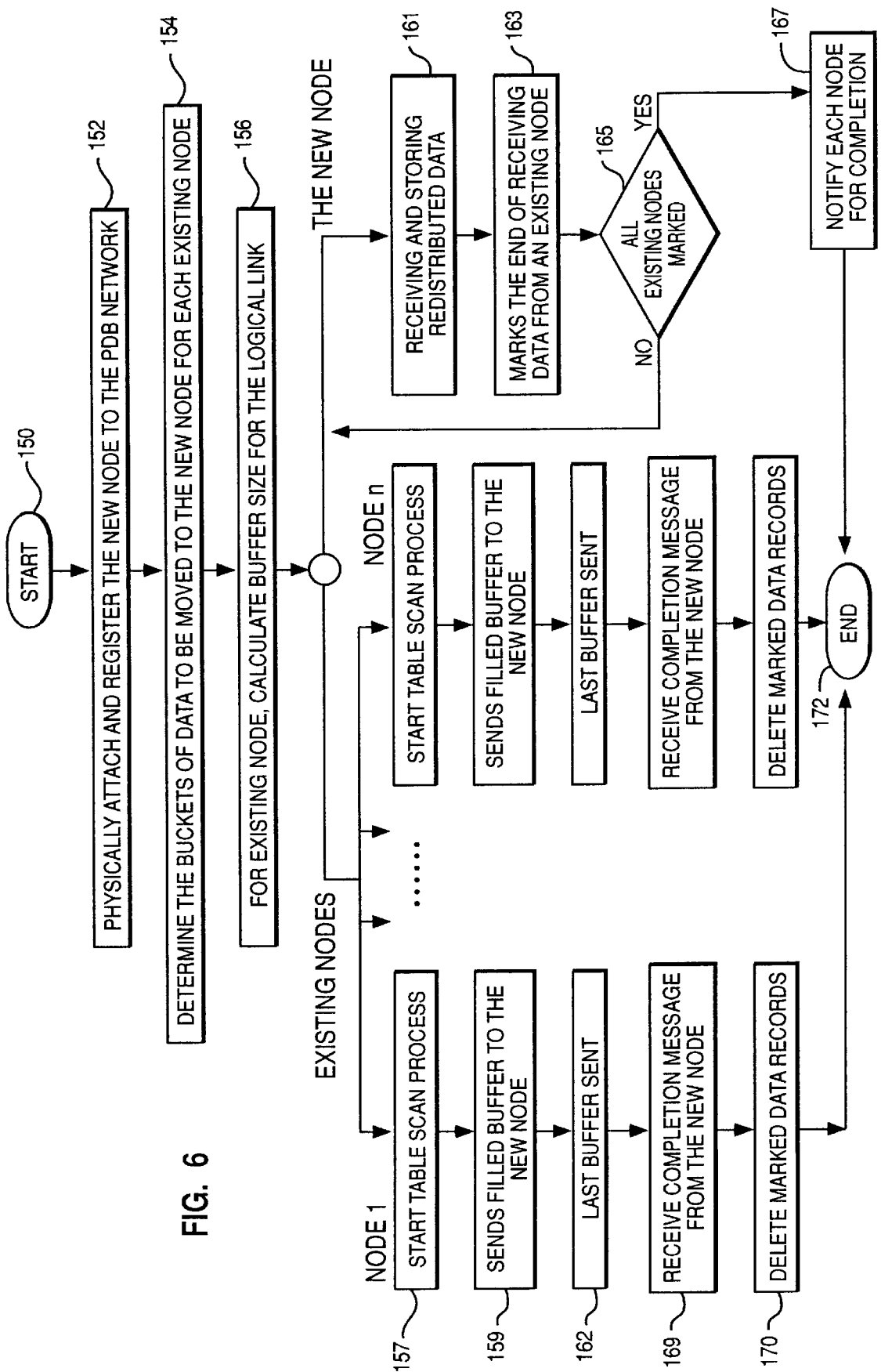
FIG. 6 is a flow diagram for redistributing data to a new node in a parallel database system.
Figure 7:
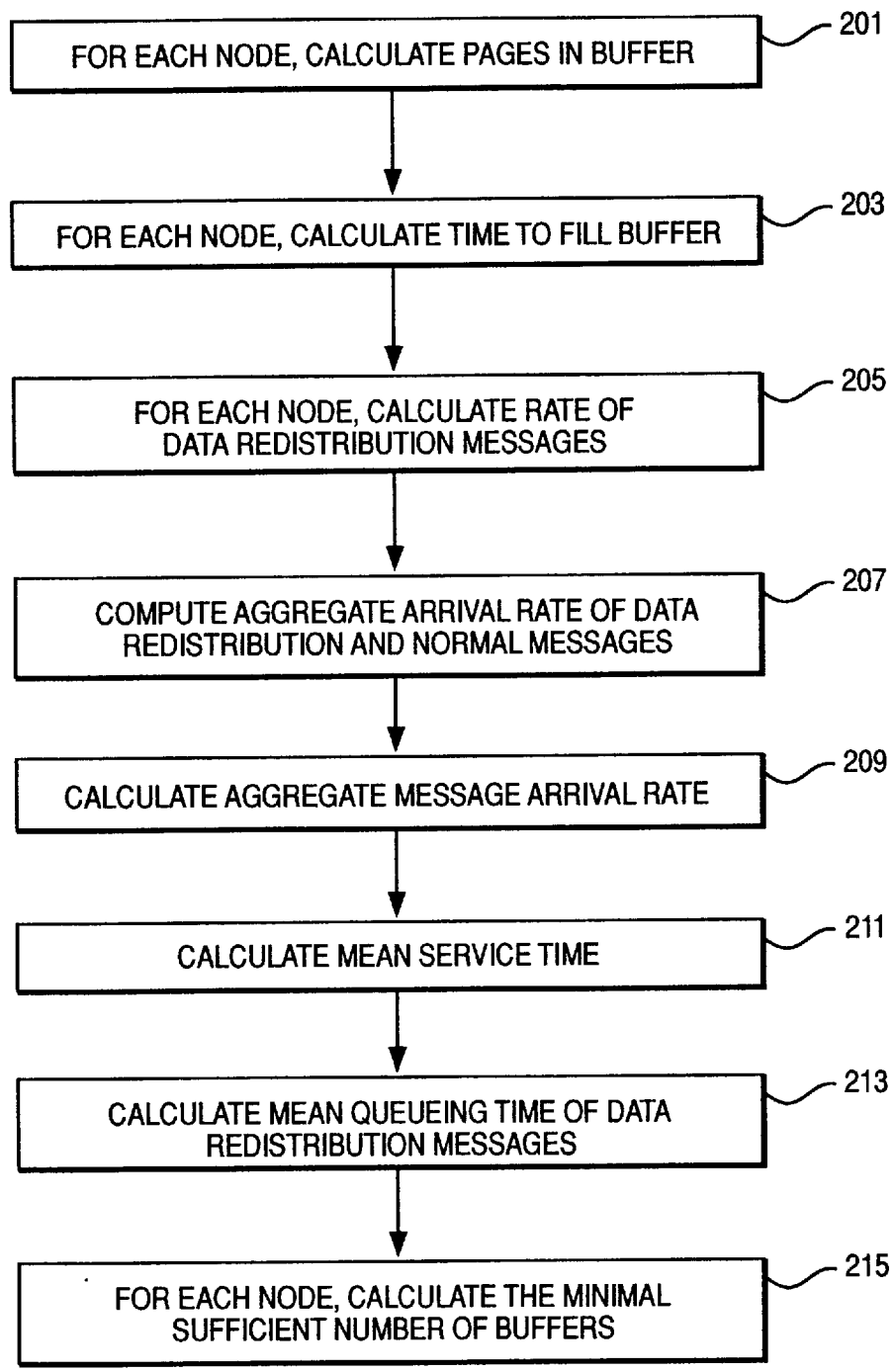
FIG. 7 depicts the process to calculate the minimum sufficient buffer space for data redistribution.

The data redistribution process for adding a new node is depicted in FIG. 6. The process starts in step 150 and proceeds to step 152 where the new node is physically attached and registered to the parallel database network. In the registration process the node ID, network address, etc., are sent to a registration server node in the PDB system. Next, in step 154, the buckets of data to be moved to the new node are determined for each existing node. Actually selecting the buckets to be redistributed is outside the scope of the present invention. However, one approach is taught in "Value Oriented Approach To Selecting Buckets for Data Redistribution" in the IBM Technical Disclosure Bulletin, Volume 36 No. 5, May 1993, pages 363 and 364, which is hereby incorporated by reference. The article teaches that buckets of data should be selected to minimize the impact to the perfromance of the PDB system, "value" is measured by determining the amount of workload in a bucket and the cost of moving the bucket from node to node, the cost of moving the bucket is a function of the size of the table from which the bucket is taken, the size of the bucket itself and the number of data records in the bucket. Those buckets with higher values will be chosen first for data redistribution. The numbers of the buckets which are chosen for redistribution are collected and stored in a data structure for use in the table scan operation. Other methods for selecting buckets for adding new nodes to a PDB system are disclosed in co-pending, commonly assigned applications Ser. Nos. 08/116,089 and 08/116,086 entitled "Selecting for Redistributing Data Between Nodes in a Parallel Database in the Quiescent Mode" and "Selecting Buckets for Redistributing Data in the Incremental Mode" to S. G. Li filed the same date as this application which are hereby incorporated by reference. Next, in step 156, the necessary buffer size for the logical link is calculated for each existing node. Calculating the buffer size is depicted in greater detail in FIG. 7.

Steps 157, 159, 162, 169 and 170 are performed in each of the existing nodes; Steps 161, 163, 165 and 167 are performed in the new node being added to the parallel database system. In step 157, the table scan process is initiated. The table scan process is described in greater detail with reference to FIG. 8 below. Next, in step 159, the communication buffer which has been filled by the table scan process is sent to the new node. The new node receives and stores the redistributed data in step 161. In step 162, the last communication buffer is sent from the existing node to the new node. Each communication buffer can contain a flag indicating the buffer is the last one or not. In step 163, the end of data reception from a given existing node is marked. The receiving node stores this information in a table which resides in the receiving node. In step 165, a test is performed to determine whether all existing nodes are marked for end of data redistribution. If true, each existing node is notified that the reception of information is complete, step 167. In step 169, the completion message is received from the new node and in step 170 the marked data records which have been transferred to the new node are deleted from the tables in the existing nodes. The process ends, step 172.

As mentioned above, the invention preferably uses queuing theory to calculate the amount of buffer space which should be set aside for the table scan operation. In the calculations below, the data placement within each table is assumed to be in a random and uniform on a specific partition. To further simplify the discussion, and to simulate practice in the real world, the data redistribution operation adds only one new node at a time. The following notations are used below for describing this queuing model:

$V\_i(T)$ is the total number of data records of table T in existing node i to be moved to the new node. These records may belong to multiple buckets.

$Z\_i(T)$ is the total number of records of table T in existing existing node i.

$L\_i(T)$ is the average record length of table T in existing node i.

$A\_i(T)$ is the average number of records per page of table T storage.

BS is the space of a communication buffer for storing data records. BS is also the size of a message excluding the header space required by communication facility.

c_p is the time required to get a page from disk to memory. It is usually considered as a constant value.

c_r is the time required to fetch a record and run hashing to determine if it is in a bucket for redistribution. It can be considered as a constant value.

c_w is the time to write a record into a communication buffer. It can be considered as a constant value.

$V\_i\_reg$ is the mean arrival rate of messages carrying information for other PDB transactions, which are not related to the data redistribution operation.

u++ is the message service rate at the new node to process data redistribution message and acknowledge it. The message service rate u++ is determined by the time required for the new node to process the received message, to handle data records in the message, and to transmit acknowledge packet to the sending node. For reasons of simplicity, assume u++ is a constant, since the messages are of a fixed length.

u_reg is the service rate that the new node handles a non-data-redistribution message. Although these messages may serve various purposes, this rate can be assumed to be constant.

Because of the nature of preparing a communication buffer for data redistribution, it is reasonable to assume these messages will arrive to the new node with the interarrival time in an exponential distribution. Also, as mentioned earlier, both u_reg and u++ are assumed to be constant. Thus, according to the notation for a general queuing system as popularized by the British statistician D. G. Kendall, this is a M/D/1 model.

The Kendall notation is of the form A/B/C, where A represents the arrival distribution, B represents the service distribution and C indicates the number of servers used. The symbol M is used to represent a Poisson process or an exponential distribution, the symbol D is used to represent fixed or constant service time, and 1 assumes a single server. More details on queuing structure can be found in Telecommunication Networks Protocols, Modeling and Analysis by Mischa Schwartz, which is hereby incorporated by reference. In the data redistribution operation, there are two primary classes of messages: (1) the message containing data records for data redistribution, and (2) the messages for other ongoing PDB transactions. Therefore, this model should be considered as a M/D/1 queuing with message classes. If it is a quiescent mode, a special case of a data redistribution operation that does not allow any non-data-redistribution operation in the entire database, while redistribution is taking place, there are only data redistribution packets.

Considering the case in existing node i the parameters of this M/D/1 model are described below: (1) The average number of pages to read from table T for fetching enough number of records to fill in a communication buffer is $P\_i(T)$, which is determined by the equation: $P\_i(T)=(BS/L\_i(T))/(V\_i(T)*A\_i(T)/Z\_i(T))$. (2) The average time to fill in a communication buffer is $R\_i(T)$, which is determined by the equation: $R\_i(T)=(c\_p*P\_i(T))+(c\_r*A\_i(T)*P\_i(T))+(c\_w*BS/L\_i(T))$. (3) Thus, the mean arrival rate of a data redistribution message is $V\_i(T)$, which is $(1/R\_i(T))$.

The probability of a message to be a regular transaction message is denoted as $p\_i\_reg$, which varies from time to time, can be derived from collected performance data. Thus, the probability of being a data redistribution message is $(1\_p\_i\_reg)$. If this is a quiescent mode data redistribution operation, $p\_i\_reg=0$.

Now, considering the behavior of the entire model, we can derive the mean queuing time, which is the mean waiting time and the mean service time, of a data redistribution communication buffer by deriving the following parameters assuming N existing nodes in PDB:

$$\text{Let } V\_reg = V\_1\_reg*p\_1\_reg + V\_2\_reg*p\_2\_reg + \ldots + V\_N\_reg*p\_N\_reg$$

and $$V{++} = V\_1(T)*(1-p\_1\_reg) + V\_2(T)*(1-p\_2\_reg) + \ldots + V_N(T)*(1-p\_N\_reg)$$

The overall mean arrival rate will be $V=V\_reg+V{++}$ The overall mean service time will be $S=(V\_reg/U\_reg + V{++}/U{++})/V$. Assuming there is zero halting time, the mean queuing time for data redistribution messages will be:

$$Q{++} = (V*S**2/2*(1-V*S)) + (1/U{++})$$

which is the same for all data redistribution messages, whichever the source node is The full table scan process will halt only if there is insufficient buffer space allocated to store the fetched records for sending. The mean halting time will be, $$H\_i(T) = Q{++} - R\_i(T)*K\_i(T) \text{ if } Q{++} > R\_i(T)*K\_i(T)$$

where $K\_i(T)$ is the number of pages reserved for communication buffers. Thus, the minimal sufficient number of buffers for a nonstop full table scan on node i for table T is the minimal value of $K\_i(T)$ that keeps $H\_i(T)$ to a value no greater than 0.

According to the above assumptions and analysis, the minimum sufficient buffer space for a logical link, which is established between node i and the new node for data redistribution on a particular table T, can be determined as: $K\_i(T)=\text{INTEGER}(Q{++}/R\_i(T))$, or the minimum buffer space is equal to the mean queuing time divided by the average time to fill the communication buffer in node i.

The process for calculating the minimal sufficient buffer space for a logical. link to support the table scan process is depicted in FIG. 6.

The process begins in step 201 where $P\_i(T)$, the number of pages to fill up the communication buffer is calculated for each node, according to the equation $P\_i(T)=BS/L\_(T)/(V\_i(T)*A\_(T)/Z\_i(T))$. Next, in step 203, $R\_i(T)$, the average time to fill a communication buffer in each node, is determined by the equation $R\_i(T)=(c\_p*P\_i(T))+(c\_i*A\_i(T)*P\_i(T))+(c\_w*BS/L\_(T))$ for each node. Next, in step 205, the $V\_i(T)$, the arrival rate of data redistribution messages from node i to the new node, is calculated for each node according to the equation:

$$V\_i(T)=1/R\_i(T).$$

Next, the aggregate arrival rate of data read distributions, V++, and that of the regular transaction messages, V_reg, are calculated. In the preferred embodiment, this is given by the equations:

$$V\_reg=V\_1\_reg*P\_1\_reg+V\_2reg*p\_2\_reg+\ldots+V\_N\_reg*p\_N\_reg$$

$$V++=V\_1(T)*(1-p\_1\_reg)+V\_2(T)*(1-p\_2\_reg)+\ldots+V\_N(T)V*(1-p\_N\_reg).$$

Next, the aggregate message arrival rate at the new node is calculated in step 209, according to the equation $V=V_{reg+}$ $v_{++}$.

In step 211, S, the mean service time at the new node, is determined by the equation:
$$S=S+V\_reg/U\_reg+(V++)/(U++))/V.$$

Next, in step 213, the mean queuing time of data redistribution messages, Q++, is calculated according to the equation:

$$Q++=(V*S**2/2*(1-V*S))+(1/U++).$$

Finally, the minimal sufficient number of buffers K_i(T) is calculated for each node by the equation:

$$K\_i(T)=\text{INTEGER}(Q++/R\_i(T)).$$

Those skilled in the art would understand that these equations are illustrative of a method to calculate the minimal sufficient buffer space and are not exclusive or other algorithms.

Figure 8:
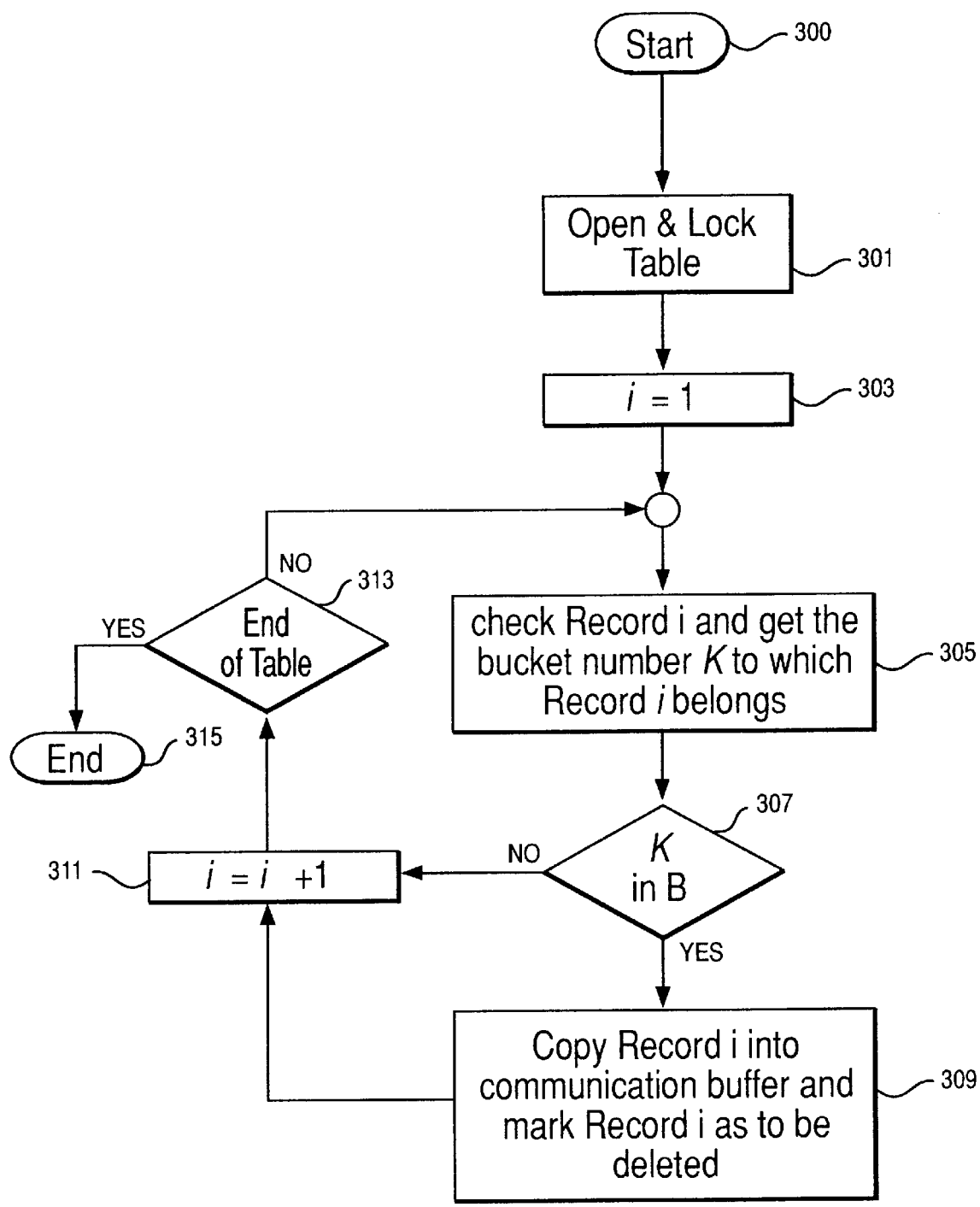
FIG. 8 is a flow diagram for a table scan operation.

The table scan process is depicted in FIG. 8. The process begins in step 300 when the table and bucket numbers within the table are given to the table scan process. With this information, the process opens and locks the table corresponding to the table number in step 301. In step 303, the process is set to check the first record in the table. In step 305, record i is checked and the bucket number k to which record i belongs is retrieved. In step 307, a test is performed to determine whether bucket number k is in the set of buckets to be redistributed. If it is, record i is copied into the communication buffer and record i is marked to be deleted once the redistribution process is complete, step 309. In step 311, the record number is incremented by one. In step 313, a test is performed to determine whether the table can process is reached the end of the table. If not, the process resumes checking records to determine whether they belong to the set of buckets to be redistributed. If the end of the table is reached, the process ends in step 315.

Figure 9:
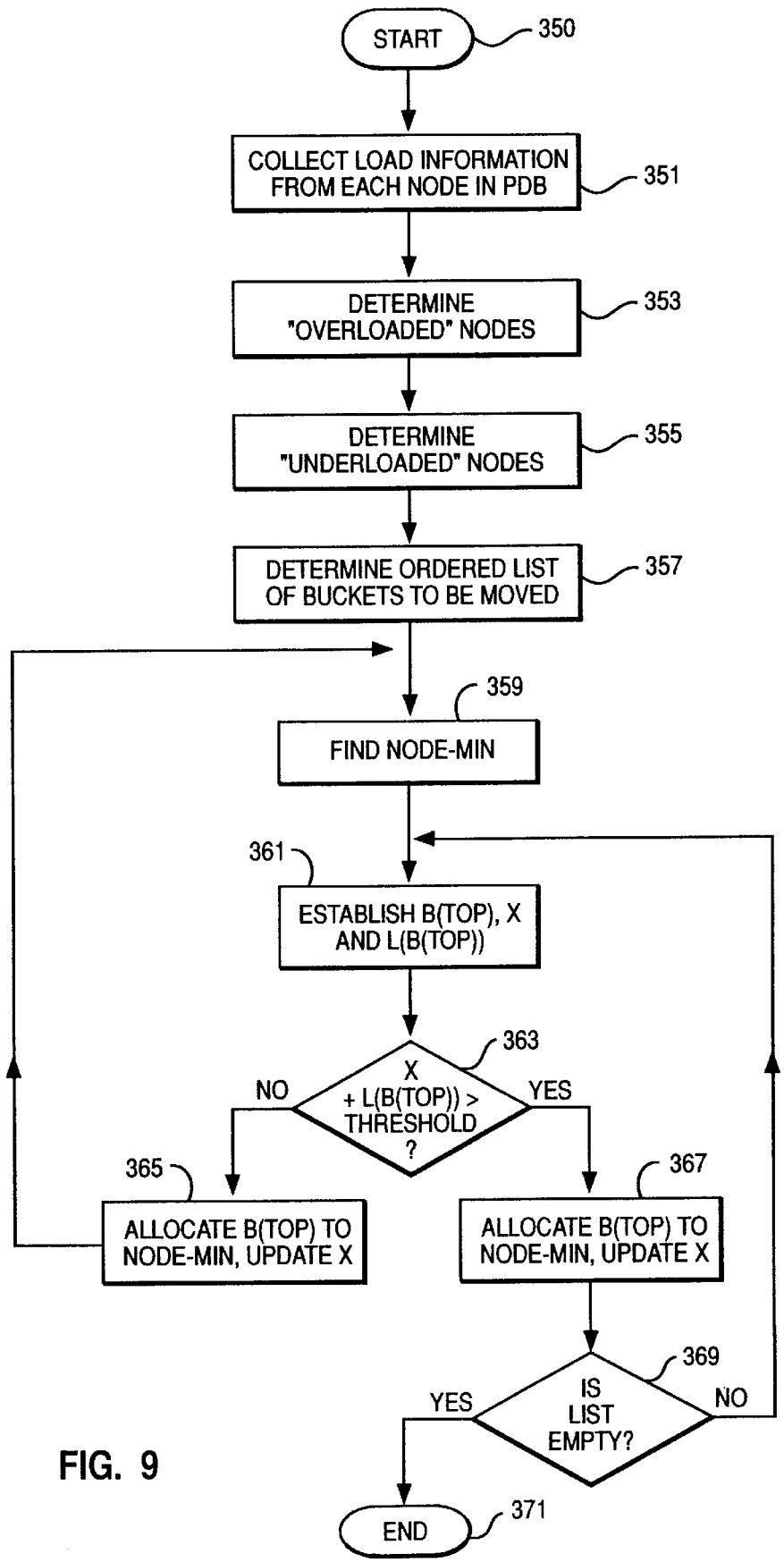
FIG. 9 is a flow diagram for determining an imbalanced condition in a parallel database system.

While the description above has concentrated on redistributing data when a new node is added into the parallel database system, the invention may also be used when the PDB system becomes imbalanced. The process for determining whether the PDB is unbalanced is depicted in FIG. 9. The process begins in step 350 by a monitoring process or a user input and continues immediately to step 351, where the data load information is collected from each node in the PDB system. Next, the step 353, the nodes which have a data load over a predetermined threshold level are determined and classified as "overloaded". Next, in step 355, the nodes which have a load lower than a predetermined minimal. standard are determined and classified as "underloaded". In step 357, an ordered list of buckets to be moved in the overloaded nodes is established. Preferably, the list is arranged in the order of buckets size and includes information such as bucket number, bucket size and node id.

The node in the underloaded category which has the least planned load is determined, and assigned the name Node-min. Planned load is determined according to the equation, planned load equals the current load plus the loads from buckets planned to be moved into the node, step 359. Next, in step 361, the top bucket in the ordered list of buckets to be moved and, X, the tentative planned load of Node-min are retrieved. L(B)top)) is determined, which is a potential load caused by the data in bucket B(Top). Next, a test is made in step 363, to determine whether the sum of X plus L(B(Top)) is greater than the predetermined threshold level. If not, in step 365, the top bucket is allocated to the Node-min and B (top) is removed from the ordered list of buckets. Additionally, X, the tentative planned load of Node-min is updated. The process continues in this loop until the tentative planned load exceed the threshold level. Once this is true, the top bucket is allocated to Node-min and removed from ordered list and Node-min's planned load is updated in step 367. Next, in test 369, the process determines whether the list of buckets to be moved is empty. If not, i.e., there are more buckets to be moved, the process returns to find the new Node-min which has the least planned load and repeats the process as described above. If there are more buckets to be moved, the process ends, step 371.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for distributing data to a first node in a parallel database system from a plurality of existing nodes, comprising the steps of:

determining according to a ratio of a mean queuing in a communication buffer and an average time to fill a communication buffer a minimal sufficient number of communication buffers to prevent a table scan operation in each of the existing nodes from stopping before completion;

allocating the minimal sufficient number of communication buffers in a memory associated with each of the existing nodes; and distributing data from each of the plurality of existing nodes to the first node.

2. The method as recited in claim 1 which further comprises the step of determining which data from at least one data table in each of the plurality of existing nodes is to be distributed to the first node.

3. The method as recited in claim 1 wherein the first node is a new node and the method further comprises the steps of:

registering the new node with the parallel database system; and establishing a logical link with each of the plurality of existing nodes.

4. The method as recited in claim 1 wherein the first node is an existing node within the parallel database system and the method further comprises the steps of:

determining that an imbalance condition exists in the parallel database system; and determining that data should be redistributed to the first node.

5. A system for distributing data to a first node in a parallel database system from a plurality of existing nodes comprising:

means for determining according to a ratio of a mean queuing in a communication buffer and an average time to fill a communication buffer a minimal sufficient number of communication buffers to prevent a table scan operation in each of the existing nodes from stopping before completion;

means for allocating the minimal sufficient number of communication buffers in a memory associated with each of the existing nodes; and means for distributing data from each of the plurality of existing nodes to the first node.

6. The system as recited in claim 5 which further comprises means for determining which data from at least one data table in each of the plurality of existing nodes is to be distributed to the first node.

7. The system as recited in claim 5 wherein the first node is a new node and the system further comprises:

means for registering the new node with the parallel database system; and means for establishing a logical link with each of the plurality of existing nodes.

8. The system as recited in claim 5 wherein the first node is an existing node within the parallel database system and the system further comprises:

means for determining that an imbalance condition exists in the parallel database system; and means for determining that data should be redistributed to the first node.

9. A computer program product resident in a computer memory for distributing data to a first node in a parallel database system from a plurality of existing nodes comprising:

instruction means within said computer memory for determining according to a ratio of a mean queuing in a communication buffer and an average time to fill a communication buffer a minimal sufficient number of communication buffers to prevent a table scan operation in each of the existing nodes from stopping before completion;

instruction means within said computer memory for allocating the minimal sufficient number of communication buffers in a memory associated with each of the existing nodes; and instruction means within said computer memory for distributing data from each of the plurality of existing nodes to the first node.

10. The computer program product as recited in claim 9 which further comprises instruction means within said computer memory for determining which data from at least one data table in each of the plurality of existing nodes is to be distributed to the first node.

11. The computer program product as recited in claim 9 wherein the first node is a new node and which further comprises:

instruction means within said computer memory for registering the new node with the parallel database system; and instruction means within said computer memory for establishing a logical link with each of the plurality of existing nodes.

12. The computer program product as recited in claim 9 wherein the first node is an existing node within the parallel database system and which further comprises:

instruction means within said computer memory for determining that an imbalance condition exists in the parallel database system; and instruction means within said computer memory for determining that data should be redistributed to the first node.

\* \* \* \* \*

UNITED STATES PATENT AND TRADEMARK OFFICE
CERTIFICATE OF CORRECTION

PATENT NO. : 5,819,083
DATED : October 6, 1998
INVENTOR(S) : *CHEN*

It is certified that error appears in the above-identified patent and that said Letters Patent is hereby corrected as shown below:

In col. 7, lines 10 and 11, please delete the second occurrence of the word "existing."

In col. 8, line 29, please delete "$...+V_N$" and insert --$...+V\_N$--.

In col. 9, lines 16 and 17, please delete "$V = V_{reg+V++}$" and insert --$V = V\_reg + V + +$--.

Signed and Sealed this

Eighteenth Day of May, 1999

Attest:

Q. TODD DICKINSON

*Attesting Officer*    Acting Commissioner of Patents and Trademarks